(12) United States Patent
Li

(10) Patent No.: US 11,354,200 B2
(45) Date of Patent: Jun. 7, 2022

(54) METHOD AND SYSTEM FOR FACILITATING DATA RECOVERY AND VERSION ROLLBACK IN A STORAGE DEVICE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 59 days.

(21) Appl. No.: 16/904,089

(22) Filed: Jun. 17, 2020

(65) Prior Publication Data

US 2021/0397523 A1   Dec. 23, 2021

(51) Int. Cl.
*G06F 11/14* (2006.01)
*G06F 12/02* (2006.01)
*G06F 12/0808* (2016.01)

(52) U.S. Cl.
CPC ...... *G06F 11/1469* (2013.01); *G06F 11/1451* (2013.01); *G06F 11/1461* (2013.01);
(Continued)

(58) Field of Classification Search
CPC .. G06F 3/0619; G06F 3/0653; G06F 12/0246; G06F 3/0673; G06F 11/1004;
(Continued)

(56) References Cited

U.S. PATENT DOCUMENTS 3,893,071 A   7/1975 Bossen
4,562,494 A   12/1985 Bond
(Continued)

FOREIGN PATENT DOCUMENTS

JP   2003022209   1/2003
JP   2011175422   9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Reginald G Bragdon
*Assistant Examiner* — Thanh D Vo
(74) *Attorney, Agent, or Firm* — Shun Yao; Yao Legal Services, Inc.

(57) ABSTRACT

One embodiment provides a system which facilitates organization of data. During operation, the system receives data associated with a logical block address (LBA) to be written to a non-volatile memory. The system stores, in a data structure, a mapping of a first physical block address (PBA) corresponding to the LBA to a first status for the data, wherein the first status indicates data validity and recovery being enabled for the data. Responsive to receiving a command to delete the data, the system modifies the first status to indicate data invalidity and recovery being enabled for the data. Responsive to receiving a command to recover the previously deleted data, the system modifies the first status to indicate data validity and recovery being enabled for the data.

18 Claims, 8 Drawing Sheets

(52) U.S. Cl.
CPC ...... *G06F 12/0246* (2013.01); *G06F 12/0808* (2013.01); *G06F 2212/7201* (2013.01)

(58) Field of Classification Search
CPC ......... G06F 2212/7201; G06F 12/0891; G06F 12/10; G06F 12/1072; G06F 11/1469; G06F 11/1451; G06F 11/1461; G06F 12/0808
See application file for complete search history.

(56) References Cited

U.S. PATENT DOCUMENTS

| | | | |
|---|---|---|---|
| 4,718,067 A | 1/1988 | Peters | |
| 4,775,932 A | 10/1988 | Oxley | |
| 4,858,040 A | 8/1989 | Hazebrouck | |
| 5,394,382 A | 2/1995 | Hu | |
| 5,602,693 A | 2/1997 | Brunnett | |
| 5,715,471 A | 2/1998 | Otsuka | |
| 5,732,093 A | 3/1998 | Huang | |
| 5,802,551 A | 9/1998 | Komatsu | |
| 5,930,167 A | 7/1999 | Lee | |
| 6,098,185 A | 8/2000 | Wilson | |
| 6,148,377 A | 11/2000 | Carter | |
| 6,226,650 B1 | 5/2001 | Mahajan et al. | |
| 6,243,795 B1 | 6/2001 | Yang | |
| 6,457,104 B1 | 9/2002 | Tremaine | |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 | 10/2009 | Bombet | |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,819,367 B1 | 8/2014 | Fallone | |
| 8,825,937 B2 | 9/2014 | Atkisson | |
| 8,832,688 B2 | 9/2014 | Tang | |
| 8,868,825 B1 | 10/2014 | Hayes | |
| 8,904,061 B1 | 12/2014 | O'Brien, III | |
| 8,949,208 B1 | 2/2015 | Xu | |
| 9,015,561 B1 | 4/2015 | Hu | |
| 9,031,296 B2 | 5/2015 | Kaempfer | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 | 9/2015 | Fallone | |
| 9,141,176 B1 | 9/2015 | Chen | |
| 9,208,817 B1 | 12/2015 | Li | |
| 9,213,627 B2 | 12/2015 | Van Acht | |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,495,263 B2 | 11/2016 | Pang | |
| 9,529,601 B1 | 12/2016 | Dharmadhikari | |
| 9,529,670 B2 | 12/2016 | O'Connor | |
| 9,575,982 B1 | 2/2017 | Sankara Subramanian | |
| 9,588,698 B1 | 3/2017 | Karamcheti | |
| 9,588,977 B1 | 3/2017 | Wang | |
| 9,607,631 B2 | 3/2017 | Rausch | |
| 9,671,971 B2 | 6/2017 | Trika | |
| 9,747,202 B1 | 8/2017 | Shaharabany | |
| 9,852,076 B1 | 12/2017 | Garg | |
| 9,875,053 B2 | 1/2018 | Frid | |
| 9,912,530 B2 | 3/2018 | Singatwaria | |
| 9,946,596 B2 | 4/2018 | Hashimoto | |
| 10,013,169 B2 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,268,390 B2 | 4/2019 | Warfield | |
| 10,318,467 B2 | 6/2019 | Barzik | |
| 10,361,722 B2 | 7/2019 | Lee | |
| 10,437,670 B1 | 10/2019 | Koltsidas | |
| 10,459,663 B2 | 10/2019 | Agombar | |
| 10,642,522 B2 | 5/2020 | Li | |
| 10,649,657 B2 | 5/2020 | Zaidman | |
| 10,678,432 B1 | 6/2020 | Dreier | |
| 10,756,816 B1 | 8/2020 | Dreier | |
| 10,928,847 B2 | 2/2021 | Suresh | |
| 2001/0032324 A1 | 10/2001 | Slaughter | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0112085 A1 | 8/2002 | Berg | |
| 2002/0161890 A1 | 10/2002 | Chen | |
| 2003/0074319 A1 | 4/2003 | Jaquette | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0143718 A1 | 7/2004 | Chen | |
| 2004/0255171 A1 | 12/2004 | Zimmer | |
| 2004/0267752 A1 | 12/2004 | Wong | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0138325 A1 | 6/2005 | Hofstee | |
| 2005/0144358 A1 | 6/2005 | Conley | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0101197 A1 | 5/2006 | Georgis | |
| 2006/0156012 A1 | 7/2006 | Beeson | |
| 2006/0184813 A1 | 8/2006 | Bui | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0250756 A1 | 10/2007 | Gower | |
| 2007/0266011 A1 | 11/2007 | Rohrs | |
| 2007/0283081 A1 | 12/2007 | Lasser | |
| 2007/0283104 A1 | 12/2007 | Wellwood | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0163033 A1 | 7/2008 | Yim | |
| 2008/0301532 A1 | 12/2008 | Uchikawa | |
| 2009/0006667 A1 | 1/2009 | Lin | |
| 2009/0089544 A1 | 4/2009 | Liu | |
| 2009/0113219 A1 | 4/2009 | Aharonov | |
| 2009/0125788 A1 | 5/2009 | Wheeler | |
| 2009/0183052 A1 | 7/2009 | Kanno | |
| 2009/0254705 A1 | 10/2009 | Abali | |
| 2009/0282275 A1 | 11/2009 | Yermalayeu | |
| 2009/0287956 A1 | 11/2009 | Flynn | |
| 2009/0307249 A1 | 12/2009 | Koifman | |
| 2009/0307426 A1 | 12/2009 | Galloway | |
| 2009/0310412 A1 | 12/2009 | Jang | |
| 2010/0031000 A1 | 2/2010 | Flynn | |
| 2010/0169470 A1 | 7/2010 | Takashige | |
| 2010/0217952 A1 | 8/2010 | Iyer | |
| 2010/0229224 A1 | 9/2010 | Etchegoyen | |
| 2010/0241848 A1 | 9/2010 | Smith | |
| 2010/0321999 A1 | 12/2010 | Yoo | |

(56) References Cited

U.S. PATENT DOCUMENTS

| | | |
|---|---|---|
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | Mcwilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1* | 1/2013 | Barton ............... G06F 16/162 707/692 |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1* | 3/2014 | Matsumura ......... G06F 11/1402 714/6.12 |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1* | 8/2014 | Zhang ................ G06F 12/0246 711/103 |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |

(56) References Cited

U.S. PATENT DOCUMENTS

| | | |
|---|---|---|
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14 https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

(56) References Cited

OTHER PUBLICATIONS

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

Arm ("Cortex-R5 and Cortex-R5F", Technical reference Manual, Revision r1p1) (Year:2011).

\* cited by examiner

METHOD AND SYSTEM FOR FACILITATING DATA RECOVERY AND VERSION ROLLBACK IN A STORAGE DEVICE

BACKGROUND

Field

This disclosure is generally related to the field of data storage. More specifically, this disclosure is related to a method and system for facilitating data recovery and version rollback in a storage device.

Related Art

Today, various storage systems are being used to store and access the ever-increasing amount of digital content. A storage system can include various storage devices which can provide persistent memory, e.g., a solid state drive (SSD) and a hard disk drive (HDD). Data stored in a storage device may be unintentionally deleted or overwritten, e.g., by mistake or by accident. A user or system may need to recover such deleted or expired data. In a conventional SSD, the system writes data blocks with their corresponding LBAs to persistent memory. If data is deleted or updated, the system marks corresponding NAND pages as invalid and to be recycled during a subsequent garbage collection process. The system can recover the deleted or updated data by delivering the original data block with its LBA back to the host.

However, because data files may be stored in multiple physical locations across multiple NAND dies via multiple channels, and these physical locations may be randomly organized, deleting or updating files can result in randomly scattered invalid pages across multiple physical locations. The system may perform garbage collection on some of the scattered pages associated with a given file (e.g., by erasing some of the scattered pages which are marked as invalid as part of a delete or an update command). As a result, the system may obtain only partial data when attempting to recover deleted or updated files.

While some data storage methods can be used to avoid data loss with a high confidence, the challenge remains to improve the reliability of data recovery and version rollback in a storage device.

SUMMARY

One embodiment provides a system which facilitates organization of data. During operation, the system receives data associated with a logical block address (LBA) to be written to a non-volatile memory. The system stores, in a data structure, a mapping of a first physical block address (PBA) corresponding to the LBA to a first status for the data, wherein the first status indicates data validity and recovery being enabled for the data. Responsive to receiving a command to delete the data, the system modifies the first status to indicate data invalidity and recovery being enabled for the data. Responsive to receiving a command to recover the previously deleted data, the system modifies the first status to indicate data validity and recovery being enabled for the data.

In some embodiments, the data structure is stored in a host memory, and the data structure is ordered based on an ascending order of LBAs. A status comprises two bits, indicates in a first bit whether corresponding data is valid, and indicates in a second bit whether recovery is enabled for the corresponding data.

In some embodiments, responsive to receiving a command to write an update of the data: the system stores, in the data structure, a mapping of a new PBA to a second status which indicates validity and recovery being enabled; the system updates the first status to indicate invalidity and recovery being enabled; and the system writes the updated data, the LBA, and the second status to the non-volatile memory at the new PBA.

In some embodiments, the first status corresponds to a prior version of the data, and the second status corresponds to a most recent version of the data. Responsive to receiving a command to recover the previously updated data: the system modifies the first status to indicate validity and recovery being enabled for the data; and the system modifies the second status to indicate invalidity and recovery being enabled for the data.

In some embodiments, responsive to receiving the command to recover the previously updated data and prior to modifying the first status to indicate validity and recovery being enabled for the data, the system determines that the most recent version of data is valid based on the second status indicating data validity and recovery being enabled for the data, thereby causing a rollback from the most recent version of the data to the prior version of the data.

In some embodiments, responsive to receiving the command to recover the previously deleted data and prior to modifying the first status to indicate data invalidity and recovery being enabled for the data, the system determines that a most recent version of data is invalid based on the first status indicating data invalidity and recovery being enabled for the data, thereby recovering the most recent version of the data.

In some embodiments, responsive to receiving the command to delete the data, the system adds an entry to an LBA journal for the LBA to indicate data invalidity and recovery being enabled for the data.

In some embodiments, the system writes the data, the LBA, and the first status to the non-volatile memory at the first PBA.

In some embodiments, the system receives a request to read data associated with the LBA. The system determines, by a flash translation layer, a source of the read request. In response to determining that the source of the read request is a host: the system obtains, from the data structure, a current PBA and a current status corresponding to the LBA; responsive to determining that the current status indicates data validity and recovery being enabled for the data, the system reads, at the obtained PBA, the requested data; responsive to determining that the current status indicates data invalidity and recovery being enabled for the data, the system determines to send, to the host, a predetermined pattern which indicates that the requested data is not valid; and the system returns the requested data or the predetermined pattern to a requester.

In some embodiments, in response to determining that the source of the read request is internal: the system obtains, from the data structure, a current PBA and a current status corresponding to the LBA; the system reads, at the obtained PBA, the requested data; and the system returns the requested data to the requester.

BRIEF DESCRIPTION OF THE FIGURES

In the figures, like reference numerals refer to the same figure elements.

DETAILED DESCRIPTION

Figure 1:
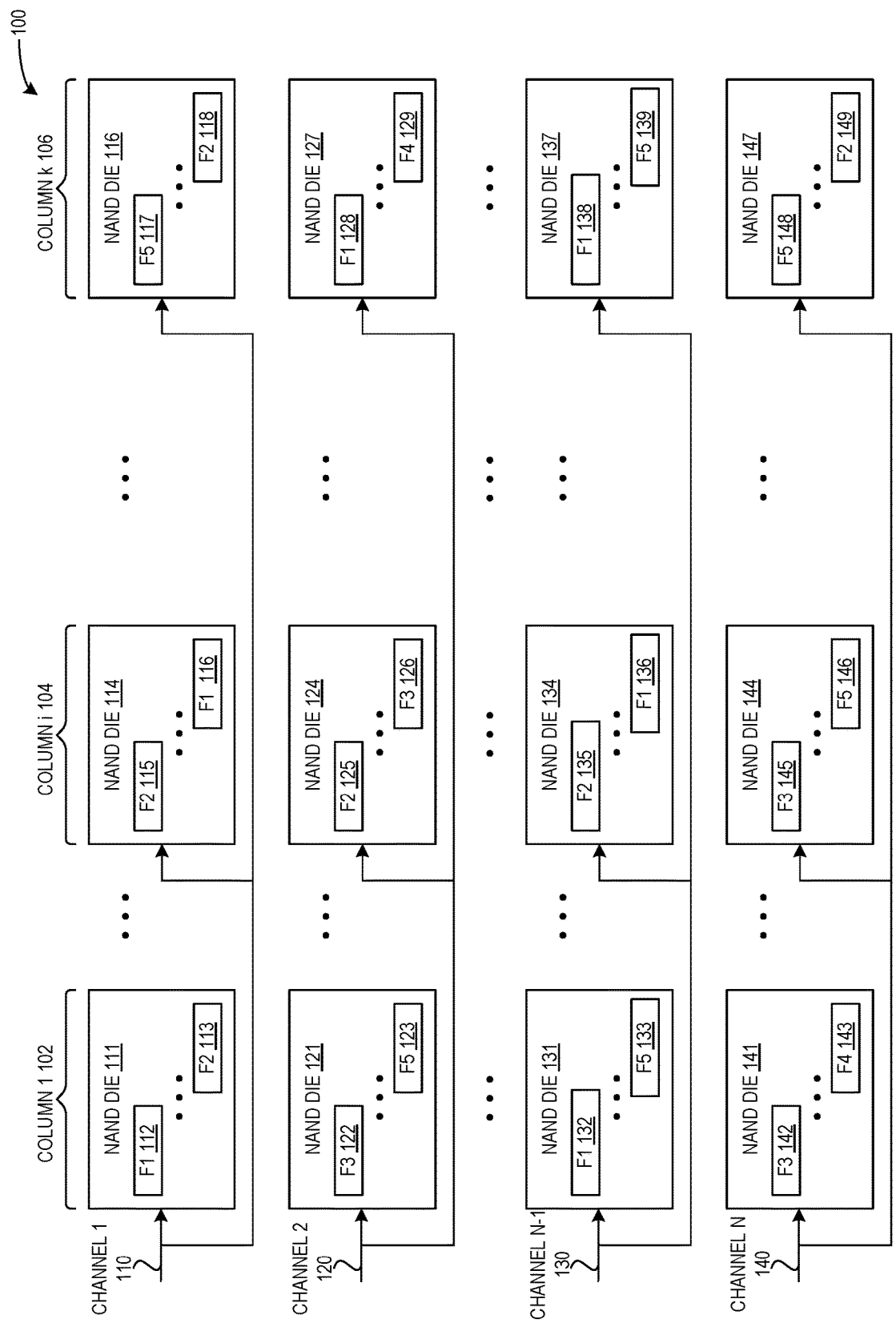
FIG. 1 illustrates an exemplary environment for data placement, with a random distribution of files across a storage drive, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein address the issues involved in recovering data in conventional storage devices by providing a system which facilitates data recovery and version rollback in an efficient and reliable manner.

As described above, data stored in a storage device may be unintentionally deleted or overwritten, e.g., by mistake or by accident. A user or system may need to recover such deleted or expired data. In a conventional SSD, the system writes data blocks with their corresponding LBAs to persistent memory. If data is deleted or updated, the system marks corresponding NAND pages as invalid and to be recycled during a subsequent garbage collection process. The system can recover the deleted or updated data by delivering the original data block with its LBA back to the host. Generally, the system can main the LBAs in a consecutive manner.

However, because data files may be stored in multiple physical locations across multiple NAND dies via multiple channels, and these physical locations may be randomly organized, deleting or updating pages can result in randomly scattered invalid pages across multiple physical locations. The system may perform garbage collection on some of the scattered pages associated with a given file (e.g., by erasing some of the scattered pages which are marked as invalid as part of a delete or an update command). As a result, the system may obtain only partial data when attempting to recover deleted or updated pages. Furthermore, even given multiple copies of a file stored across devices in a distributed storage system, the garbage collection process and other operations (e.g., restoring an operating system) may result in losing some or part of the file. This data loss can affect the quality and reliability of data recovery. An exemplary conventional SSD is described below in relation to FIG. 1.

While some data storage methods can be used to avoid data loss with a high confidence, the challenge remains to improve the reliability of data recovery and version rollback in a storage device.

The embodiments described herein address these issues by creating a "flagmap" which indicates the "status" of every LBA stored on the physical media of a storage drive, regardless of whether the LBA is associated with valid or invalid data (e.g., data which is marked as invalid and to be recycled as a result of a delete or an update command). Even if a given LBA is "expired" or "deleted" from the perspective of the system, the data itself can remain in the physical storage media and be accessed based on the connection between the LBA and the data via the flagmap. The status can include if data is valid or invalid, and if a data recovery protection feature is enabled or not enabled for the data.

Specifically, the flagmap can be a data structure or an array that indicates status by assigning two bits for each LBA whose corresponding data is currently stored on the physical media. One bit (i.e., the first bit or the most significant bit (MSB)) can indicate whether the corresponding data is valid or invalid, and the other bit (e.g., the second bit or the least significant bit (LSB)) can indicate whether a recovery is enabled for the corresponding data. For example: a flagmap entry or status value of "11" can indicate valid data with enabled protection, while a flagmap entry or status value of "10" can indicate invalid data with enabled protection. An exemplary flagmap array is described below in relation to FIG. 2.

The flagmap array can be stored in the host memory, and can collaborate with the mapping table to provide data recovery and version rollback in a storage device. The flagmap can support real-time updates and random search/access, based on the known ascending order of LBAs. The flagmap array can correspond to a PBA array, e.g., in a data structure which maps PBAs to statuses for data, where the data structure is ordered based on an ascending order of LBAs, as described below in relation to FIG. 3.

Data can be written into the physical media of a persistent storage device with its LBA and (e.g., 2-bit) status. Because the physical storage media of a non-volatile memory may not support in-place writes, the data+LBA+status bundle can be written to a physical location of the NAND as determined by the PBA mapping table stored in the host memory. A NAND block can store page-level LBAs+statuses, and can also store block-level LBAs+statuses (e.g., an LBA+status journal). The flagmap array in persistent memory is thus based on the physical layout and organization of the PBAs, and is out-of-order in a same manner as its corresponding LBAs, as described below in relation to FIG. 3.

The system can receive data to be written to persistent memory, and can set the status of the data to "11," which indicates valid data and enabled protection. The system can store the status in the flagmap array, where the status is mapped to a corresponding original PBA in the mapping table in host memory. The system can also write the status along with the data and the LBA to the persistent memory at the original PBA. The system can receive a command to update or delete the date. If the system receives a command to update the data written to the original PBA with new data, the system can write the new data to a new PBA and can store a mapping of the new PBA to a status which indicates valid data and enabled protection ("11"). The system can update the status associated with the original PBA to a new status which indicates invalid data and enabled protection ("10") ("prior version"), and can also write the new data, the LBA, and the new status to the persistent memory at the new PBA ("most recent version").

If the system receives a command to delete the data, the system can modify the status for the data to indicate invalid data and enabled recovery ("10") ("deleted version"). For example, the system can modify the status in the flagmap array from "11" to "10." The system can also add an LBA journal entry for the LBA to indicate invalid data and enabled recovery ("10").

Subsequently, the system can receive a command to recover the previously updated data or the previously deleted data. The system can determine whether a most recent version of the data is valid. The data can be valid is the data was previously updated, and the data can be invalid if the data was previously deleted. If the system determines that the most recent version of data is valid (i.e., receives a command to recover the previously updated data), the system can roll back to the prior version of data by flipping the valid and invalid status of, respectively, the most recent version and the prior version. That is, the system can modify the status of the most recent version of data from "11" to "10," and can modify the status of the prior version of data from "10" to "11."

If the system determines that the most recent version of data is invalid (i.e., receives a command to recover the previously deleted data), the system can re-validate the deleted version, by modifying the status of the deleted version from "10" to "11." Writing, updating, deleting, and recovering data are described below in relation to the exemplary write flow of FIGS. 4A-4B. An exemplary read flow is described below in relation to FIGS. 5A and 5B.

Thus, by maintaining the flagmap array which indicates both data validity/invalidity and recovery enablement/disablement, the described embodiments facilitate a system which provides data recovery and version rollback in a storage device, while only consuming two extra bits per LBA associated with data stored in the physical media of a storage device. The described system can address the issues involved in the conventional systems relating to inconsistent data recovery in response to commands to recover deleted or updated data. The additional improvements allow the system to store and maintain essential data and further recover protected data via a white-box SSD for consolidating data in the event of an accident. The system can reconstruct the data stored in the persistent memory based on the corresponding metadata (including the LBA, the status, the PBA to status mapping, the ascending LBA order, and the PBA physical layout), thus allowing a host to reconstruct data in a guaranteed, reliable, and consistent manner while ensuring a loss of no data or information. The system can also tune the background operations to match the data recovery protection methods described herein.

A "storage system infrastructure," "storage infrastructure," or "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory or a "persistent memory" which can provide persistent storage of data, e.g., a solid state drive (SSD), a hard disk drive (HDD), or a flash-based storage device.

A "non-volatile storage device" refers to a computing device, entity, server, unit, or component which can store data in a persistent or a non-volatile memory (e.g., in a "persistent memory" or in a "physical media" or "physical storage media" of a storage device). In the embodiments described herein, the non-volatile storage device is depicted as a solid state drive (SSD), which includes a plurality of dies which can be accessed over a plurality of channels, but other non-volatile storage devices can be used.

A "computing device" refers to any server, device, node, entity, drive, or any other entity which can provide any computing capabilities.

A "flagmap" refers to a data structure which indicates the "status" of every LBA stored on a physical media of a storage device. The data structure can be, e.g., an array. The status can be indicated as two bits. One bit (e.g., the most significant bit (MSB)) can indicate if the corresponding data is valid or invalid (also referred to as "data validity" or "data invalidity"). The other bit (e.g., the least significant bit (LSB)) can indicate if a data recovery or protection feature is enabled or disabled for the corresponding data (also referred to as "recovery being enabled for the data" or "recovery being disabled for the data"). Exemplary statuses are described below in relation to FIG. 2. In this disclosure, the terms "flagmap," "flagmap entry," and "status" are used interchangeably, while the term "flagmap array" refers to the data structure.

A "mapping table" generally refers to a data structure which maps LBAs to PBAs. In this disclosure, a mapping table can map PBAs to flagmap entries or statuses, based on an ascending order of LBAs.

An "LBA journal" refers to a block-wise list of LBAs which are associated with data stored in a given block. An "LBA journal entry" refers to an entry which is added to the LBA journal when new data is written to the given block.

Exemplary Data Placement in the Prior Art

FIG. 1 illustrates an exemplary environment 100 for data placement, with a random distribution of files across a storage drive, in accordance with the prior art. Environment 100 can indicate the persistent memory of a storage device, such as an SSD, and can include multiple channels, e.g., channels 1 110, 2 120, N−1 130, and N 140. Each channel can be associated with one or more NAND dies, and each NAND die can be accessed via a channel. For example: NAND dies 111 and 114 can be accessed via channel 1 110; NAND dies 121 and 124 can be accessed via channel 2 120; NAND dies 131 and 134 can be accessed via channel N−1 130; and NAND dies 141 and 144 can be accessed via channel N 140. Columns 1 102, i 104, and k 104 can indicate groupings of NAND dies.

The system of environment 100 can store data corresponding to a single file across multiple dies. For example, a file F1 can be stored as pages indicated by: F1 112 in NAND die 111; F1 132 in NAND die 131; F1 116 in NAND die 114; F1 136 in NAND die 134; F1 128 in NAND die 127; and F1 138 in NAND die 137. Similarly, a file F2 can be stored as pages indicated by: F2 113 in NAND die 111; F2 115 in NAND die 114; F2 125 in NAND die 124; F2 135 in NAND die 134; F2 118 in NAND die 116; and F2 149 in NAND die 147. Files F3, F4, and F5 can be similarly stored across multiple NAND dies.

The SSD depicted in environment 100 can perform garbage collection operations, such that when data is deleted or updated, the system can mark the corresponding NAND pages as invalid and to be recycled during a subsequent garbage collection operation. Furthermore, an SSD may be in service for a period of several months before being fully formatted, which, along with the channel parallelism and garbage collection operations, may result in the files being stored in multiple physical locations in the SSD, as depicted by the pages and data of files F1 and F2 spread across multiple NAND dies in FIG. 1. While the LBAs may remain consecutive, the conventional SSD may place the data in a randomly organized physical layout in the storage media of the non-volatile memory. A subsequent garbage collection operation may result in invalid pages (e.g., resulting from a delete or an update operation) being erased, and valid pages being moved to an available NAND block. Certain tools may scan the physical locations inside the SSD to read out the contents of the NAND pages/blocks of the dies. However, because certain portions of a data file may be erased before other portions of the same data file, the integrity of the data may have already been lost, and any recovered partial data may not be reliable, as even a small portion of lost data can invalidate the integrity of an entire data file or other unit of data.

As an example, as described above, F2 is spread across at least six dies: 111, 114, 116, 124, 134, and 147. If any of the data relating to F2 is deleted or updated, the corresponding data which is deleted or updated can be marked as invalid and to be recycled during a subsequent garbage collection process. At any subsequent time, the system may only be able to recover a portion of all the data relating to F2. As a result, the recovered portion cannot be guaranteed to be valid data. This can decrease the reliability of data recovery and version rollback in an SSD.

Exemplary Flagmap Array

Figure 2:
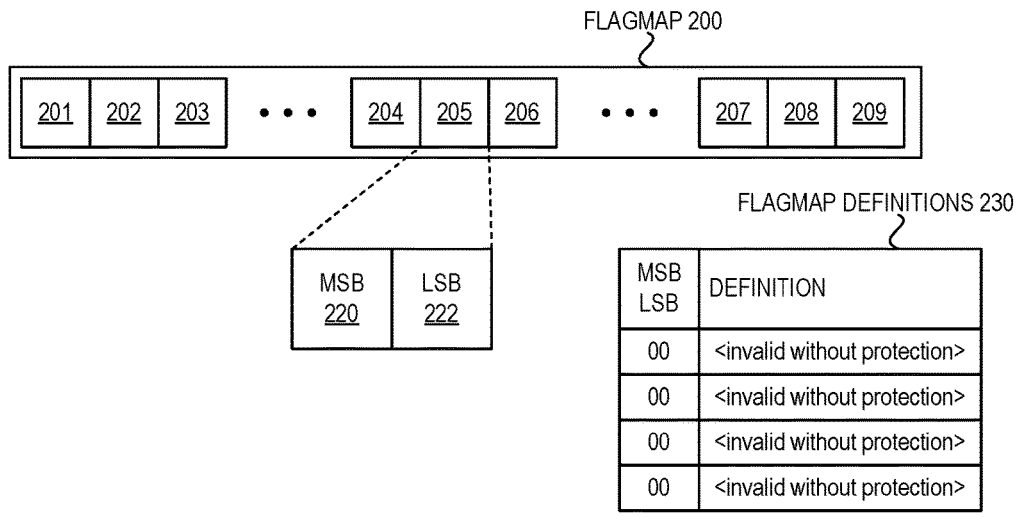
FIG. 2 illustrates an exemplary flagmap array, in accordance with an embodiment of the present application.

FIG. 2 illustrates an exemplary flagmap or flagmap array 200, in accordance with an embodiment of the present application. Flagmap array 200 can be an array which includes 2-bit groupings or entries 201-209, which denote or indicate the status of every LBA stored on the physical media of a storage drive, regardless of whether the LBA is associated with valid or invalid data. The invalid data can be data which is marked as invalid as a result of a delete or an update operation. In the described embodiments, the system can maintain the data itself in the physical storage media, and access the data using flagmap array 200 which provides a connection or mapping between the LBA and the data (e.g., at a certain PBA).

Flagmap array 200 can indicate status by assigning two bits for LBAs associated with data currently stored on the physical media. For example, in grouping or entry 205, one bit, e.g., a most significant bit (MSB) 220, can indicate whether the corresponding data is valid (with a value of "1") or invalid (with a value of "0"). The other bit, e.g., a least significant bit (LSB) 222, can indicate whether a recovery is enabled for the corresponding data (with a value of "1") or disabled for the corresponding data (with a value of "0"). For example: a status or flagmap value of "11" can indicate data validity and recovery being enabled for the data, while a status or flagmap value of "10" can indicate data invalidity and recovery being enabled for the data.

Host Memory Domain and Persistent Storage Domain

Figures 3A, 3B:
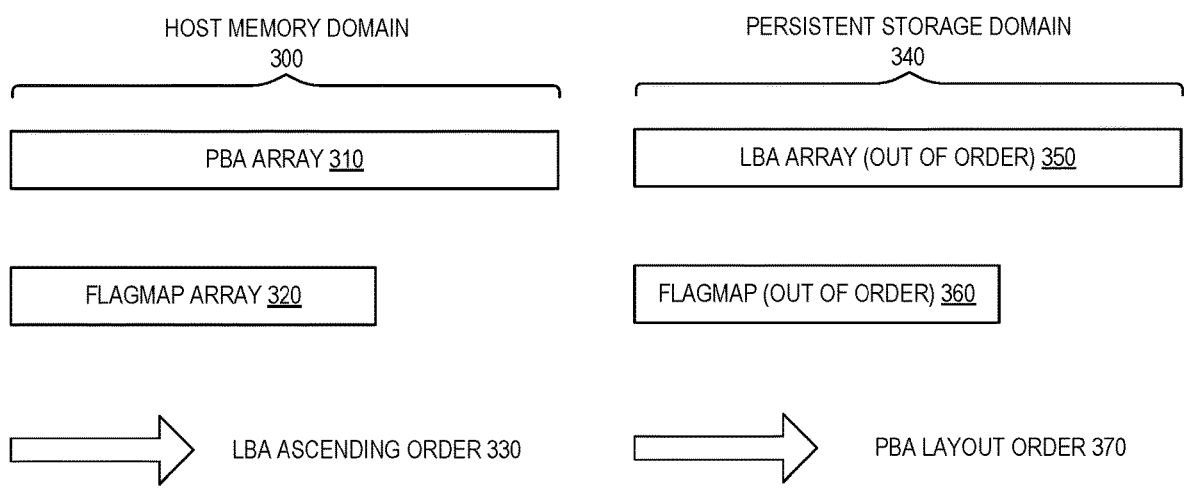
FIG. 3A illustrates an exemplary host memory domain, in accordance with an embodiment of the present application.
FIG. 3B illustrates an exemplary persistent storage domain, in accordance with an embodiment of the present application.

FIG. 3A illustrates an exemplary host memory domain 300, in accordance with an embodiment of the present application. Host memory storage domain can store a PBA array 310 and a flagmap array 320. The data stored at the PBAs listed in PBA array 310 can correspond to LBAs which are in an LBA ascending order 330, e.g., in a consecutive or sequential order. As a result, host memory domain 300 can store a data structure with entries which map each PBA corresponding to an ascending ordered LBA to a flagmap or status for the corresponding data. That is, PBA array 310 and flagmap array 320 can form a data structure which maps PBAs to flagmaps or statuses. This data structure can be a mapping table and can be referred to as a "PBA mapping table."

Flagmap array 320 can support random access and real-time updates, based on the known ascending order of the LBAs. Because the index of both of PBA array 310 and flagmap array 320 corresponds to and can be translated to the LBAs, which are in an ascending order, the system does not need to store the LBA array. This savings in the consumption of storage capacity can lead to an increase in the capacity of the overall storage system. Moreover, the ascending order of the LBAs can support a straightforward and uncomplicated execution of random search and access operations.

FIG. 3B illustrates an exemplary persistent storage domain 340, in accordance with an embodiment of the present application. Persistent storage domain 340 can include the non-volatile or persistent memory, such as NAND flash memory in the physical media of an SSD. Persistent storage domain 340 can include an LBA array (out of order) 350 and a flagmap array (out of order) 360. The LBAs of LBA array 350 can out of order based on a PBA layout order 370 (e.g., a physical organization of data in persistent storage domain 340). Flagmap array 360 can track to LBA array 350 based on the written status and an LBA journal.

An exemplary write operation, along with deleting, updating, and recovering data, is described below in relation to FIGS. 4A-4B.

Exemplary Method for Writing Data and Performing Data Recovery

Figure 4A:
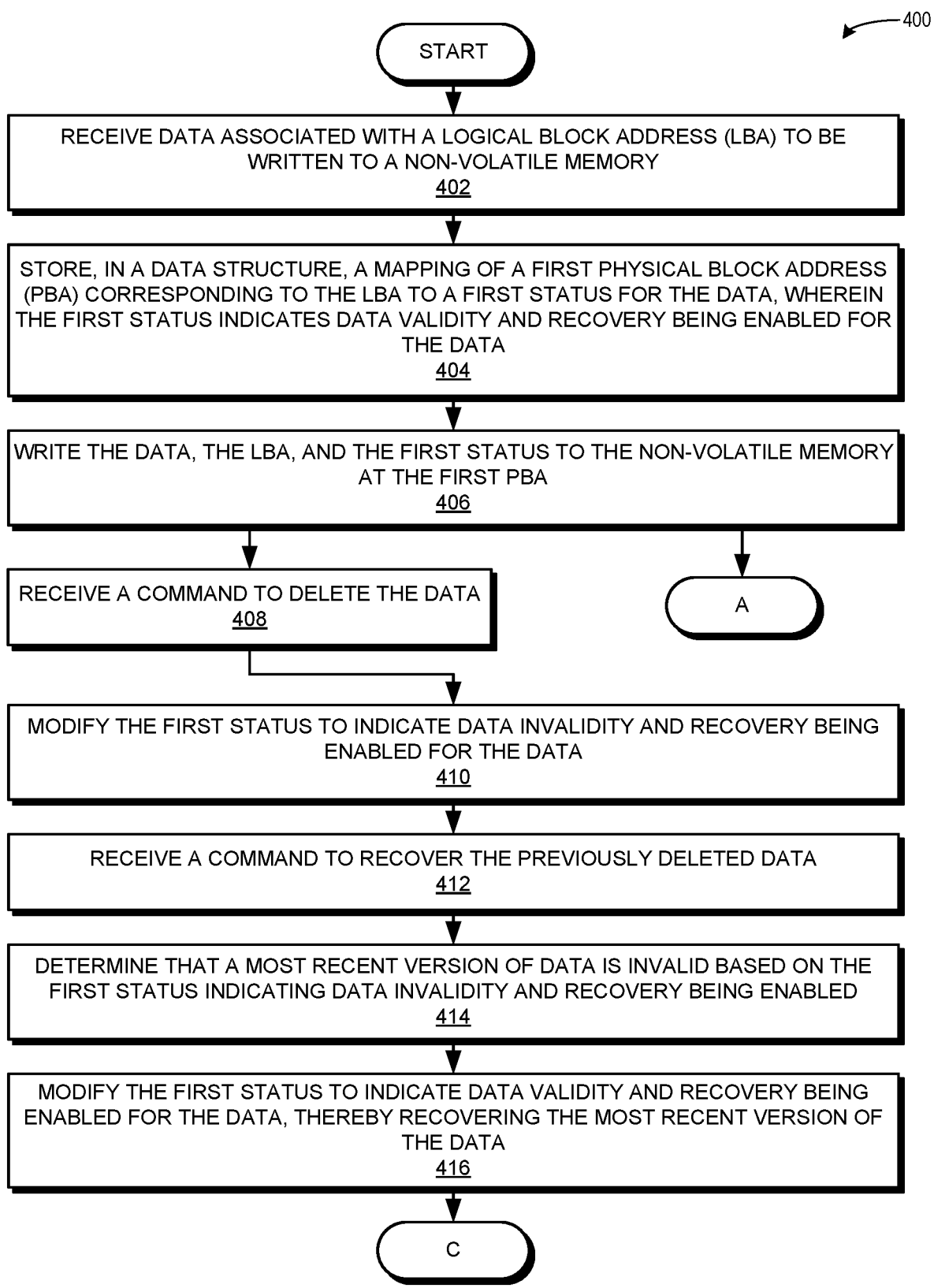
FIG. 4A presents a flowchart illustrating a method for facilitating a write operation and a data recovery, in accordance with an embodiment of the present application.

FIG. 4A presents a flowchart 400 illustrating a method for facilitating a write operation and a data recovery, in accordance with an embodiment of the present application. During operation, the system receives data associated with a logical block address (LBA) to be written to a non-volatile memory (operation 402). The system stores, in a data structure, a mapping of a first physical block address (PBA) corresponding to the LBA to a first status for the data, wherein the first status indicates data validity and recovery being enabled for the data (operation 404). The system writes the data, the LBA, and the first status to the non-volatile memory at the first PBA (operation 406). The system can receive a command to delete the data (operation 408), or the operation can continue at Label A of FIG. 4B (receiving a command to write an update to the data).

Responsive to receiving the command to delete the data, the system modifies the first status to indicate data invalidity and recovery being enabled for the data (operation 410). The system receives a command to recover the previously deleted data (operation 412). Responsive to receiving the command to recover the previously deleted data, the system determines that a most recent version of data is invalid based on the first status indicating data invalidity and recovery being enabled (operation 414). The system modifies the first status to indicate data validity and recovery being enabled for the data (operation 416). The operation continues at Label A of FIG. 5A.

Figure 4B:
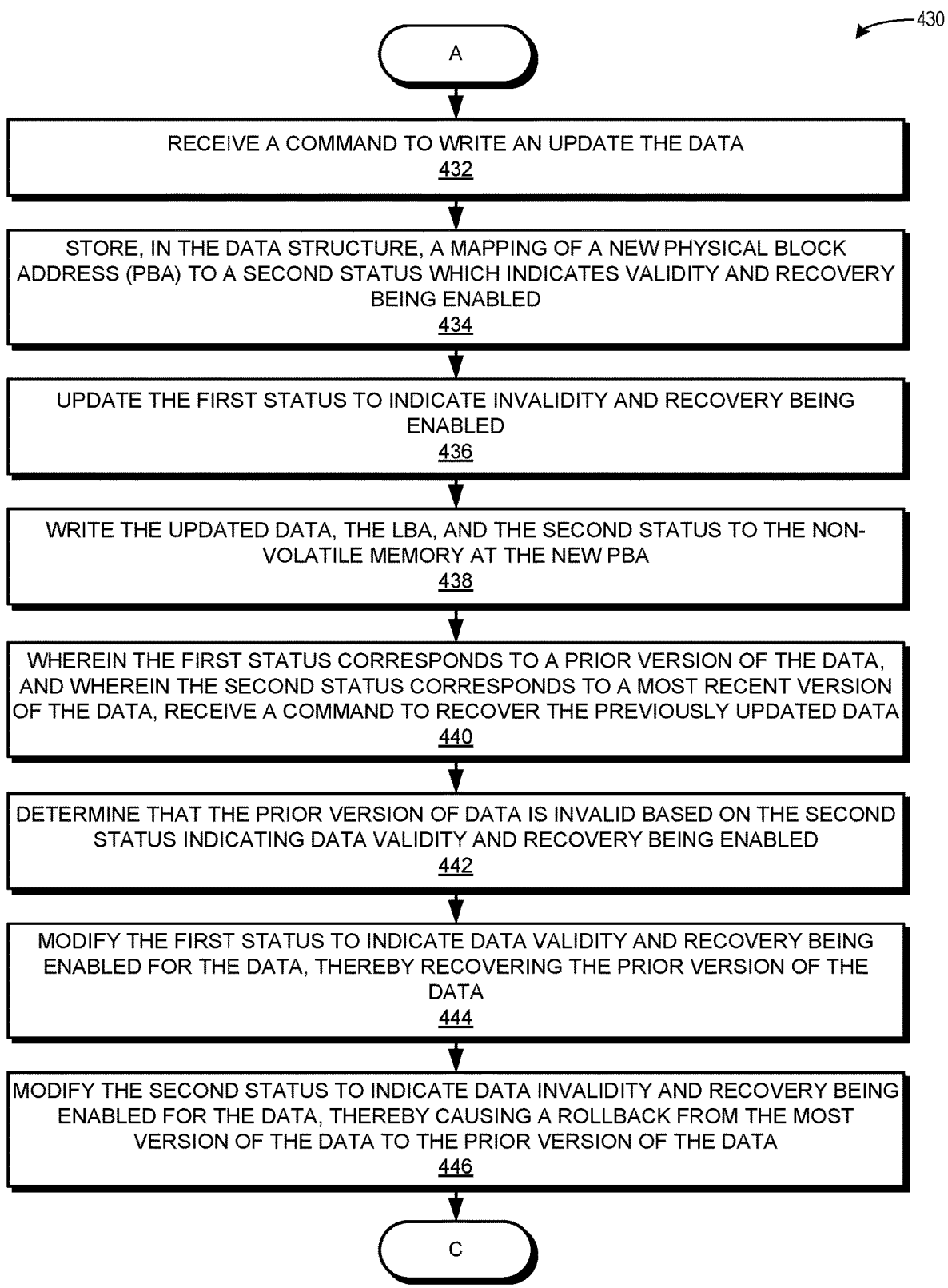
FIG. 4B presents a flowchart illustrating a method for facilitating a write operation and a data recovery, in accordance with an embodiment of the present application.

FIG. 4B presents a flowchart 430 illustrating a method for facilitating a write operation and a data recovery, in accordance with an embodiment of the present application. During operation, the system receives a command to write an update of the data (operation 432). Responsive to receiving the command to write an update of the data, the system stores, in the data structure, a mapping of a new PBA to a second status which indicates validity and recovery being enabled (operation 434). The system updates the first status to indicate invalidity and recovery being enabled (operation 436). The system writes the updated data, the LBA, and the second status to the non-volatile memory at the new PBA (operation 438).

The first status corresponds to a prior version of the data, and the second status corresponds to a most recent version of the data. The system receives a command to recover the previously updated data (operation 440). Responsive to receiving the command to recover the previously updated data, the system determines that the prior version of data is invalid based on the second status indicating data validity and recovery being enabled (operation 442). The system modifies the first status to indicate validity and recovery being enabled for the data, thereby recovering the prior version of the data (operation 444). The system also modifies the second status to indicate invalidity and recovery being enabled for the data, thereby causing a rollback from the most recent version of the data to the prior version of the data (operation 446). The operation continues at Label C of FIG. 5A.

The system can also use a similar method in reverse in order to revert back to the most recent version from the prior version. For example, in order to reverse the recovery operation, the system can modify the first status to indicate invalidity and recovery being enabled for the data, thereby recovering the most recent version of the data (e.g., the reverse of operation 444). The system can also modify the second status to indicate validity and recovery being enabled for the data, thereby causing a rollback from the prior version of the data back to the most recent version of the data (e.g., the reverse of operation 446).

Exemplary Method for Reading Data

Figure 5A:
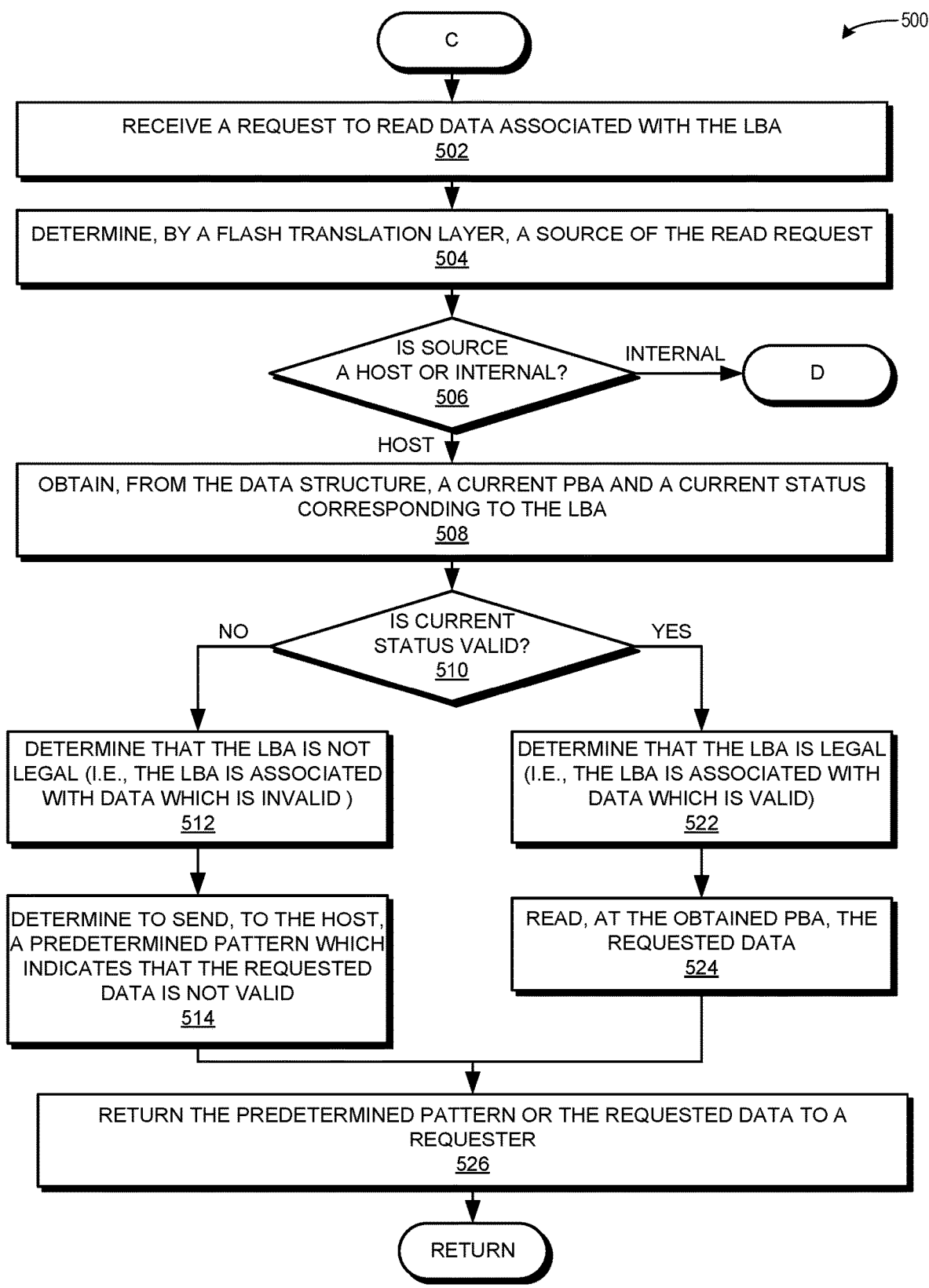
FIG. 5A presents a flowchart illustrating a method for facilitating a read operation, in accordance with an embodiment of the present application.

FIG. 5A presents a flowchart 500 illustrating a method for facilitating a read operation, in accordance with an embodiment of the present application. During operation, the system receives a request to read data associated with the LBA (operation 502). The system determines, by a flash translation layer, a source of the read request (operation 504). If the source is internal (decision 506), the operation continues at Label D of FIG. 5B. If the source is a host (decision 506), the system obtains, from the data structure, a current PBA and a current status corresponding to the LBA (operation 508). If the current status indicates data invalidity and recovery being enabled for the data (decision 510), the system determines that the LBA is not legal (i.e., the LBA is associated with data which is invalid) (operation 512). The system determines to send, to the host, a predetermined pattern which indicates that the requested data is not valid (operation 514), and the operation continues at operation 526.

If the current status indicates data validity and recovery being enabled for the data (decision 510), the system determines that the LBA is legal (i.e., the LBA is associated with data which is valid) (operation 522). The system reads, at the obtained PBA, the requested data (operation 524). Subsequently, the returns the predetermined pattern or the requested data to a requester (operation 526), and the operation returns.

Figure 5B:
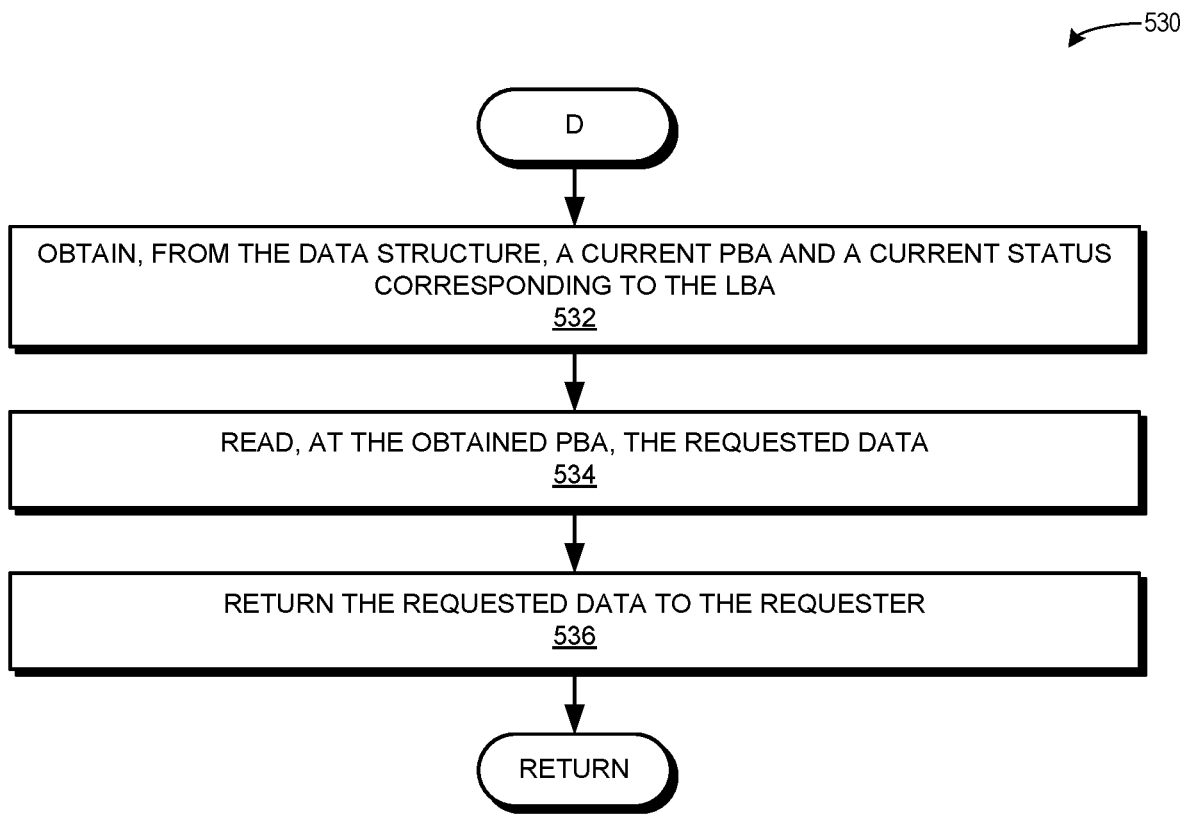
FIG. 5B presents a flowchart illustrating a method for facilitating a read operation, in accordance with an embodiment of the present application.

FIG. 5B presents a flowchart 530 illustrating a method for facilitating a read operation, in accordance with an embodiment of the present application. In response to determining that the source of the read request is internal (decision 506), the system obtains, from the data structure, a current PBA and a current status corresponding to the LBA (operation 532). The system reads, at the obtained PBA, the requested data (operation 534). The system returns the requested data to the requester (operation 536), and the operation returns.

Exemplary Computer System and Apparatus

Figure 6:
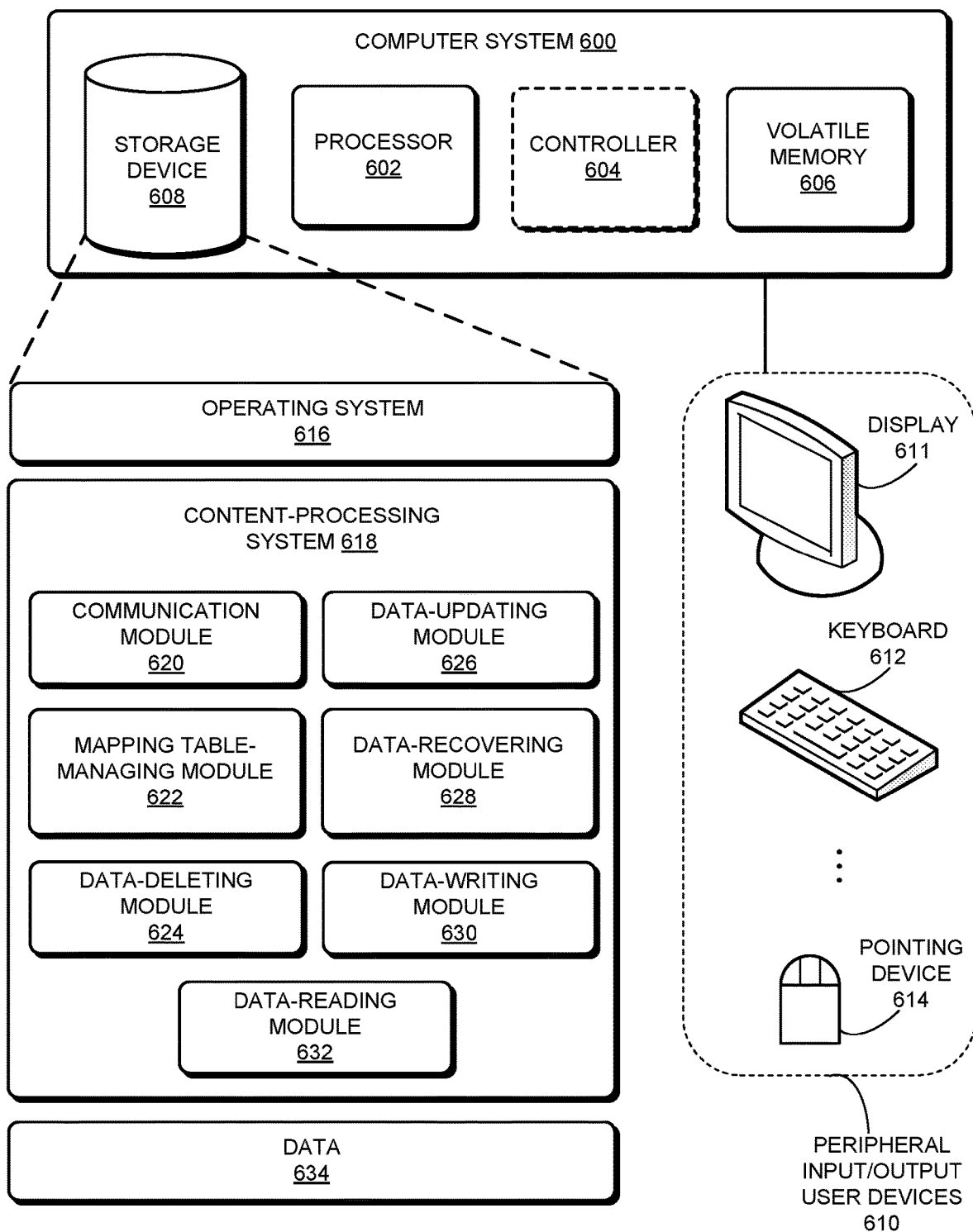
FIG. 6 illustrates an exemplary computer system that facilitates organization of data, in accordance with an embodiment of the present application.

FIG. 6 illustrates an exemplary computer system that facilitates organization of data, in accordance with an embodiment of the present application. Computer system 600 includes a processor 602, a volatile memory 606, and a storage device 608. In some embodiments, computer system 600 can include a controller 604 (indicated by the dashed lines). Volatile memory 606 can include, e.g., random access memory (RAM), that serves as a managed memory, and can be used to store one or more memory pools. Storage device 608 can include persistent storage which can be managed or accessed via processor 602 (or controller 604). Furthermore, computer system 600 can be coupled to peripheral input/output (I/O) user devices 610, e.g., a display device 611, a keyboard 612, and a pointing device 614. Storage device 608 can store an operating system 616, a content-processing system 618, and data 634.

Content-processing system 618 can include instructions, which when executed by computer system 600, can cause computer system 600 or processor 602 to perform methods and/or processes described in this disclosure. Specifically, content-processing system 618 can include instructions for receiving and transmitting data packets, including data to be read or written, an input/output (I/O) request (e.g., a read request or a write request), metadata, a logical block address (LBA), a physical block address (PBA), and an indicator of a flagmap, a status, or two bits (communication module 620).

Content-processing system 618 can further include instructions for receiving data associated with a logical block address (LBA) to be written to a non-volatile memory (communication module 620). Content-processing system 618 can include instructions for storing, in a data structure, a mapping of a first physical block address (PBA) corresponding to the LBA to a first status for the data, wherein the first status indicates data validity and recovery being enabled for the data (mapping table-managing module 622). Content-processing system 618 can also include instructions for, responsive to receiving a command to delete the data (data-deleting module 624), modifying the first status to indicate data invalidity and recovery being enabled for the data (mapping table-managing module 622). Content-processing system 618 can include instructions for, responsive to receiving a command to recover the previously deleted data (data-recovering module), modifying the first status to indicate data validity and recovery being enabled for the data (mapping table-managing module 622).

Content-processing system 618 can additionally include instructions for, responsive to receiving a command to write an update of the data (data-updating module 626), storing, in the data structure, a mapping of a new PBA to a second status which indicates validity and recovery being enabled (mapping table-managing module 622). Content-processing system 618 can include instructions for updating the first status to indicate invalidity and recovery being enabled (mapping table-managing module 622) and for writing the updated data, the LBA, and the second status to the non-volatile memory at the new PBA (data-writing module 630).

Content-processing system 618 can also include instructions for, responsive to receiving a command to recover the previously updated data (data-recovering module 628), modifying the first status to indicate validity and recovery being enabled for the data (mapping table-managing module 622) and modifying the second status to indicate invalidity and recovery being enabled for the data (mapping table-managing module 622).

Content-processing system 618 can further include instructions for receiving a request to read data associated with the LBA (operation 632), and for performing the operations described above in relation to FIGS. 5A and 5B.

Data 634 can include any data that is required as input or generated as output by the methods and/or processes described in this disclosure. Specifically, data 634 can store at least: data; a request; a logical block address (LBA); a physical block address (PBA); a mapping table; a flagmap; a flagmap array; a flagmap entry; a status; a status indicated by two bits; a most significant bit and a least significant bit; a mapping table; a mapping between a PBA which corresponds to an LBA and a status; a command; a modified or updated status; an indicator of data validity or invalidity; an indicator of recovery being enabled or disabled for corresponding data; an indicator of a host memory domain or a persistent storage domain; an ascending order; an ascending order of LBAs; a flagmap array ordered in the ascending order of LBAs, where each flagmap entry and LBA corresponds to a PBA; a flagmap array which is out of order and corresponds to out-of-order LBAs, which corresponds to PBAs based on a PBA layout of physical media of a storage device; a PBA layout; a most recent version of data; a prior version of data; a rollback; a rollback from the most recent version of data to the prior version of data, or vice versa; deleted or erased data; updated data; data which is marked as valid or invalid; data which is deleted or updated and is marked with a status indicating data invalidity and data recovery being enabled for the data; an LBA journal; an entry in an LBA journal; an indicator or identifier for a flash translation layer (FTL) component, module, entity, or unit; a predetermined pattern; a notification; a current PBA; and a current status.

Figure 7:
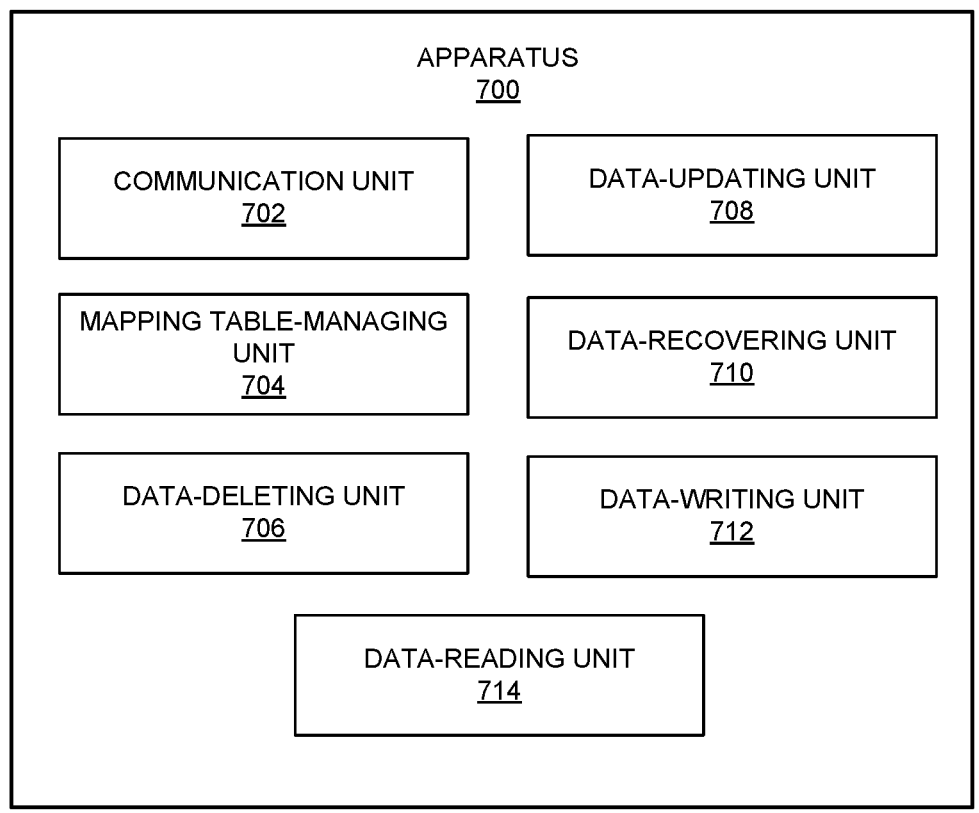
FIG. 7 illustrates an exemplary apparatus that facilitates organization of data, in accordance with an embodiment of the present application.

FIG. 7 illustrates an exemplary apparatus 700 that facilitates organization of data, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Furthermore, apparatus 700 may be integrated in a computer system, or realized as a separate device or devices capable of communicating with other computer systems and/or devices.

Apparatus 700 can comprise modules or units 702-714 which are configured to perform functions or operations similar to modules 620-632 of computer system 600 of FIG. 6, including: a communication unit 702; a mapping table-managing unit 704; a data-deleting unit 706; a data-updating unit 708; a data-recovering unit 710; a data-writing unit 712; and a data-reading unit 714.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving data associated with a logical block address (LBA) to be written to a non-volatile memory; and
storing, in a data structure, a mapping of a first physical block address (PBA) corresponding to the LBA to a first status for the data, wherein the first status indicates data is valid and recovery being enabled for the data;
responsive to receiving a first command to write an update of the data:
storing, in the data structure, a mapping of a new PBA to a second status which indicates data is valid and recovery being enabled;
updating the first status to indicate data is invalid and recovery being enabled; and
writing the updated data, the LBA, and the second status to the non-volatile memory at the new PBA, wherein the first status corresponds to a prior version of the data,
wherein the second status corresponds to a most recent version of the data; and
responsive to receiving a second command to recover the updated data:
modifying the first status to indicate data is valid and recovery being enabled for the data, thereby recovering the prior version of the data; and
modifying the second status to indicate data is invalid and recovery being enabled for the data, thereby causing a rollback from the most recent version to the prior version.

2. The method of claim 1,
wherein the data structure is stored in a host memory,
wherein the data structure is ordered based on an ascending order of LBAs, and
wherein a status comprises two bits, indicates in a first bit whether corresponding data is valid, and indicates in a second bit whether recovery is enabled for the corresponding data.

3. The method of claim 1, wherein responsive to receiving the second command to recover the updated data and prior to modifying the first status to indicate data is valid and recovery being enabled for the data, the method further comprises:

determining that the most recent version of data is valid based on the second status indicating data is valid and recovery being enabled for the data.

4. The method of claim 1, further comprising:
responsive to receiving a third command to delete the data, modifying the first status to indicate data is invalid and recovery being enabled for the data; and
responsive to receiving a fourth command to recover the deleted data, modifying the first status to indicate data is valid and recovery being enabled for the data.

5. The method of claim 4, wherein responsive to receiving the fourth command to recover the deleted data and prior to modifying the first status to indicate data is invalid and recovery being enabled for the data, the method further comprises:
determining that a most recent version of data is invalid based on the first status indicating data is invalid and recovery being enabled for the data,
thereby recovering the most recent version of the data.

6. The method of claim 4, wherein responsive to receiving the third command to delete the data, the method further comprises:
adding an entry to an LBA journal for the LBA to indicate data is invalid and recovery being enabled for the data.

7. The method of claim 1, further comprising:
writing the data, the LBA, and the first status to the non-volatile memory at the first PBA.

8. The method of claim 1, further comprising:
receiving a request to read data associated with the LBA;
determining, by a flash translation layer, a source of the read request;
in response to determining that the source of the read request is a host:
obtaining, from the data structure, a current PBA and a current status corresponding to the LBA;
responsive to determining that the current status indicates data is valid and recovery being enabled for the data, reading, at the obtained PBA, the requested data;
responsive to determining that the current status indicates data is invalid and recovery being enabled for the data, determining to send, to the host, a predetermined pattern which indicates that the requested data is not valid; and
returning the requested data or the predetermined pattern to a requester; and
in response to determining that the source of the read request is internal:
obtaining, from the data structure, a current PBA and a current status corresponding to the LBA;
reading, at the obtained PBA, the requested data; and
returning the requested data to the requester.

9. A computer system, comprising:
a processor; and
a memory coupled to the processor and storing instructions which, when executed by the processor, cause the processor to perform a method, the method comprising:
receiving data associated with a logical block address (LBA) to be written to a non-volatile memory;
storing, in a data structure, a mapping of a first physical block address (PBA) corresponding to the LBA to a first status for the data,
wherein the first status indicates data is valid and recovery being enabled for the data;
responsive to receiving a first command to delete the data, modifying the first status to indicate data is invalid and recovery being enabled for the data; and
responsive to receiving a second command to recover the deleted data, modifying the first status to indicate data is valid and recovery being enabled for the data.

10. The computer system of claim 9,
wherein the data structure is stored in a host memory,
wherein the data structure is ordered based on an ascending order of LBAs, and
wherein a status comprises two bits, indicates in a first bit whether corresponding data is valid, and indicates in a second bit whether recovery is enabled for the corresponding data.

11. The computer system of claim 9, wherein the method further comprises:
responsive to receiving a third command to write an update of the data:
storing, in the data structure, a mapping of a new PBA to a second status which indicates data is valid and recovery being enabled;
updating the first status to indicate data is invalid and recovery being enabled; and
writing the updated data, the LBA, and the second status to the non-volatile memory at the new PBA.

12. The computer system of claim 11, wherein the first status corresponds to a prior version of the data, wherein the second status corresponds to a most recent version of the data, and wherein the method further comprises:
responsive to receiving a fourth command to recover the previously updated data:
modifying the first status to indicate data is valid and recovery being enabled for the data, thereby recovering the prior version of the data; and
modifying the second status to indicate data is invalid and recovery being enabled for the data, thereby causing a rollback from the most recent version to the prior version.

13. The computer system of claim 12, wherein responsive to receiving the fourth command to recover the updated data and prior to modifying the first status to indicate data is valid and recovery being enabled for the data, the method further comprises:
determining that the most recent version of data is valid based on the second status indicating data is valid and recovery being enabled for the data.

14. The computer system of claim 9, wherein responsive to receiving the second command to recover the deleted data and prior to modifying the first status to indicate data is invalid and recovery being enabled for the data, the method further comprises:
determining that a most recent version of data is invalid based on the first status indicating data is invalid and recovery being enabled for the data,
thereby recovering the most recent version of the data.

15. The computer system of claim 9,
wherein responsive to receiving the first command to delete the data, the method further comprises:
adding an entry to an LBA journal for the LBA to indicate data is invalid and recovery being enabled for the data.

16. The computer system of claim 9, wherein the method further comprises:
receiving a request to read data associated with the LBA;
determining, by a flash translation layer, a source of the read request;
in response to determining that the source of the read request is a host:
obtaining, from the data structure, a current PBA and a current status corresponding to the LBA;

responsive to determining that the current status indicates data is valid and recovery being enabled for the data, reading, at the obtained PBA, the requested data;

responsive to determining that the current status indicates data is invalid and recovery being enabled for the data, determining to send, to the host, a predetermined pattern which indicates that the requested data is not valid; and returning the requested data or the predetermined pattern to a requester; and in response to determining that the source of the read request is internal:

obtaining, from the data structure, a current PBA and a current status corresponding to the LBA;

reading, at the obtained PBA, the requested data; and returning the requested data to the requester.

17. An apparatus, comprising:

a communication module configured to receive data associated with a logical block address (LBA) to be written to a non-volatile memory;

a mapping table-managing module configured to store, in a data structure, a mapping of a first physical block address (PBA) corresponding to the LBA to a first status for the data, wherein the first status indicates data is valid and recovery being enabled for the data;

responsive to the communication module receiving a command to delete the data, the mapping table-managing module is further configured to modify the first status to indicate data is invalid and recovery being enabled for the data; and responsive to the communication module receiving a command to recover the deleted data, the mapping table-managing module is further configured to modify the first status to indicate data is valid and recovery being enabled for the data.

18. A computer-implemented method, comprising:

receiving data associated with a logical block address (LBA) to be written to a non-volatile memory;

storing, in a data structure, a mapping of a first physical block address (PBA) corresponding to the LBA to a first status for the data, wherein the first status indicates data is valid and recovery being enabled for the data;

responsive to receiving a first command to delete the data, modifying the first status to indicate data is invalid and recovery being enabled for the data; and responsive to receiving a second command to recover the deleted data, modifying the first status to indicate data is valid and recovery being enabled for the data.

* * * * *

UNITED STATES PATENT AND TRADEMARK OFFICE
CERTIFICATE OF CORRECTION

| | |
|---|---|
| PATENT NO. | : 11,354,200 B2 |
| APPLICATION NO. | : 16/904089 |
| DATED | : June 7, 2022 |
| INVENTOR(S) | : Shu Li |

It is certified that error appears in the above-identified patent and that said Letters Patent is hereby corrected as shown below:

In the Claims

Claim 12, Column 14, Line 29 "previously updated data:" should read "updated data:"

Signed and Sealed this
Sixteenth Day of May, 2023

Katherine Kelly Vidal
*Director of the United States Patent and Trademark Office*